United States Patent

[11] 3,552,587

| [72] | Inventor | Robert A. Warren |
| | | Long Beach, Calif. |
| [21] | Appl. No. | 721,729 |
| [22] | Filed | Apr. 16, 1968 |
| [45] | Patented | Jan. 5, 1971 |
| [73] | Assignee | McDonnell Douglas Corporation |
| | | a corporation of Maryland |

[54] POWERED HOIST-BAGGAGE CONTAINER HANDLING SYSTEM
4 Claims, 5 Drawing Figs.

[52] U.S. Cl. .................................................. 214/75,
 244/137, 294/81, 294/67
[51] Int. Cl. ....................................................... B60p 1/54
[50] Field of Search ........................................... 294/81,
 81SF, 67.4; 214/75; 244/137

[56] References Cited
UNITED STATES PATENTS

| 2,950,073 | 8/1960 | McLain et al. ................. | 214/75X |
| 3,028,130 | 4/1962 | Burton ......................... | 244/137X |
| 3,034,659 | 5/1962 | Willison et al. ............... | 212/14 |
| 3,164,406 | 1/1965 | Barry ............................ | 294/81(S.F.) |

*Primary Examiner*—Gerald M. Forlenza
*Assistant Examiner*—Raymond B. Johnson
*Attorneys*—Walter J. Jason, Donald L. Royer and Jack C. Munro ABSTRACT: A cargo handling system to place cargo load supporting elements in the fuselage of a vehicle comprising a hoist mechanism supported by the vehicle which automatically places within the vehicle or removes therefrom the load supporting elements. The hoist mechanism includes a two position latching system which in the first position affects automatic securing to the load supporting element and in the second position is not secured to the load supporting element.

PATENTED JAN 5 1971

INVENTOR.
ROBERT A. WARREN
BY
Jack C. Munro
—AGENT—

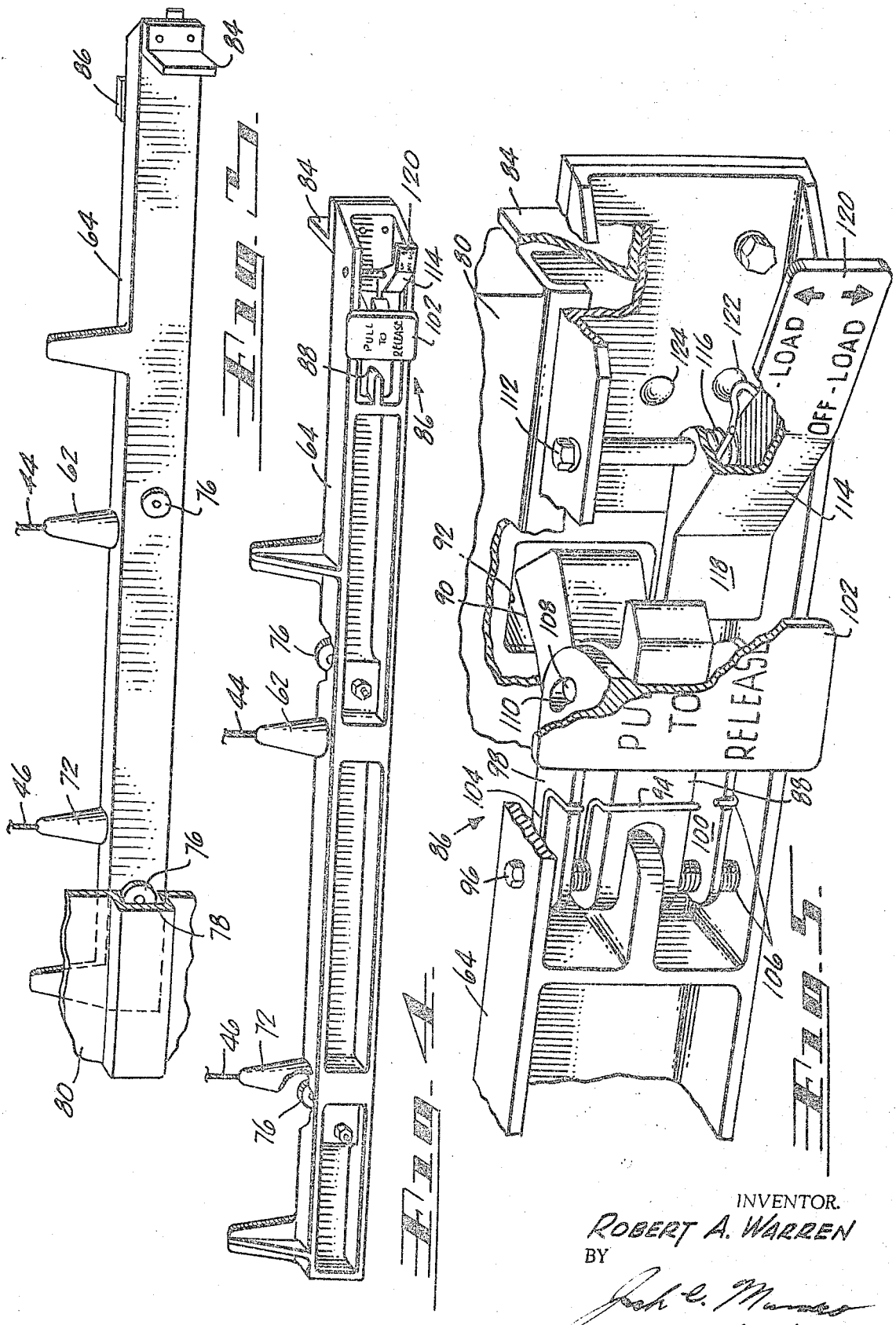

POWERED HOIST-BAGGAGE CONTAINER HANDLING SYSTEM

BACKGROUND OF THE INVENTION

In the passenger transportation type of vehicles it is desirable to decrease the nontransporting time of the vehicle. In aircraft this problem is of major significance due to the cost of the vehicle and the vehicle's transporting speed. For every minute of time lost in flying with the present day subsonic aircraft, 10 miles of transporting distance is lost.

One of the major causes of lost time in aircraft is the loading and removal of passenger baggage. The airlines require that a baggage system which has the capability of loading and removing passenger baggage in less time than is required to enplane or deplane the passengers be employed. The baggage section of an aircraft is usually located in the lower portion of the fuselage directly under the passenger floor and in longitudinal alignment therewith. The present manner of loading and unloading baggage is to manually lift the baggage into the compartment through a bottom opening door and manually remove therefrom the baggage when it is desired to unload it. With a limited number of passengers this procedure is adequate as it can be completed in the time required to refuel the aircraft and perform other necessary maintenance procedures. However, as the number of passengers increases the time required to manually load and unload the baggage increases while the necessary aircraft maintenance procedures do not take longer to perform. Actually, with the technological advances the maintenance procedures are being able to be completed in a shorted period of time.

Presently, the number of passengers in a single aircraft can be as great as 250 and in the near future it is anticipated that 500 passengers per craft will not be uncommon. Since the nonflying time of the aircraft is not increasing, some means must be employed to facilitate passenger baggage loading and unloading.

SUMMARY OF THE INVENTION

The apparatus of this invention relates to a system for the loading and unloading of passenger baggage within the aircraft. The system is designed to be most effective with a side opening door in the aircraft fuselage and to place within the aircraft fuselage containers which contain passenger baggage. The hoisting mechanism is to be stored within the aircraft during flight and extendable exteriorally through the baggage compartment door during the loading and unloading operations of the baggage containers. The hoisting mechanism includes a pair of spaced hoist bars which are to cooperate with a special type of baggage container. Each hoist bar includes a latching mechanism which functions to securely retain the hoist bar to the container. The hoisting mechanism itself is designed to automatically complete a whole cycle of movement, i.e. to pick up a container, place it within the aircraft and withdraw itself from the container back to its starting position. During the unloading procedure the cycle of movement is the same except the hoist mechanism functions to move itself within the aircraft fuselage and pick up a container and withdraw the container from the aircraft and place it on appropriate apparatus to transport it to the airport terminal.

The latching mechanism can be located to a load or unload position. With the latching mechanism in the load position, each hoist bar is manually located on the container and then the hoist mechanism picks up the container and transports it into the aircraft fuselage. As each latching mechanism comes near the aircraft fuselage, a portion of each of the mechanisms contacts a protuberance on the fuselage of the aircraft which causes the latching mechanism to become unlocked with the container. Therefore, as the hoisting mechanism begins to withdraw, each of the hoist bars are no longer attached to the container and they slide freely out of contact with the container and back to the original position to pick up another container. When the latching mechanism is located in the unload position, as the hoisting bars move into the fuselage of the aircraft each bar comes in contact with the container and each latching mechanism ratchets to lock the hoisting bar to the container. In this position no portion of the latching mechanism comes into contact with the protuberance on the aircraft fuselage. With each of the hoisting bars locked to the container, the hoisting mechanism can withdraw the container from the aircraft and deposit it where desired. At this point the latching mechanism must be manually released permitting the hoisting mechanism to repeat the procedure.

Besides the object of the invention which have been enumerated above, further objects of the invention, which are not as apparent, are as follows. By employing a side opening door within an aircraft fuselage a larger size container can be employed and therefore more effective use of the cargo space is achieved. Easier loading is achieved through a side opening type of door as opposed to a bottom opening door. The hoisting mechanism of this invention can be made relatively inexpensively and moves with each aircraft thereby negating the requirement for such at each terminal. The hoisting mechanism of this invention has more flexibility of operation than previous hoisting mechanisms in that it is not necessary to accurately locate the container in any certain position to load or unload from the aircraft. The hoisting mechanism of this invention can be employed even if the height of the baggage compartment varies from terminal to terminal.

BRIEF DESCRIPTION OF THE DRAWING

FIG. 3 is a partly in section perspective view of one side of the hoist bar which is employed in this invention.

FIG. 4 is a perspective view of the other side of the hoist bar which is employed in this invention.

FIG. 5 is a perspective view of the latching mechanism which is employed in conjunction with the hoist bar of this invention.

DETAILED DESCRIPTION OF THE SHOWN EMBODIMENT

Figure 1:
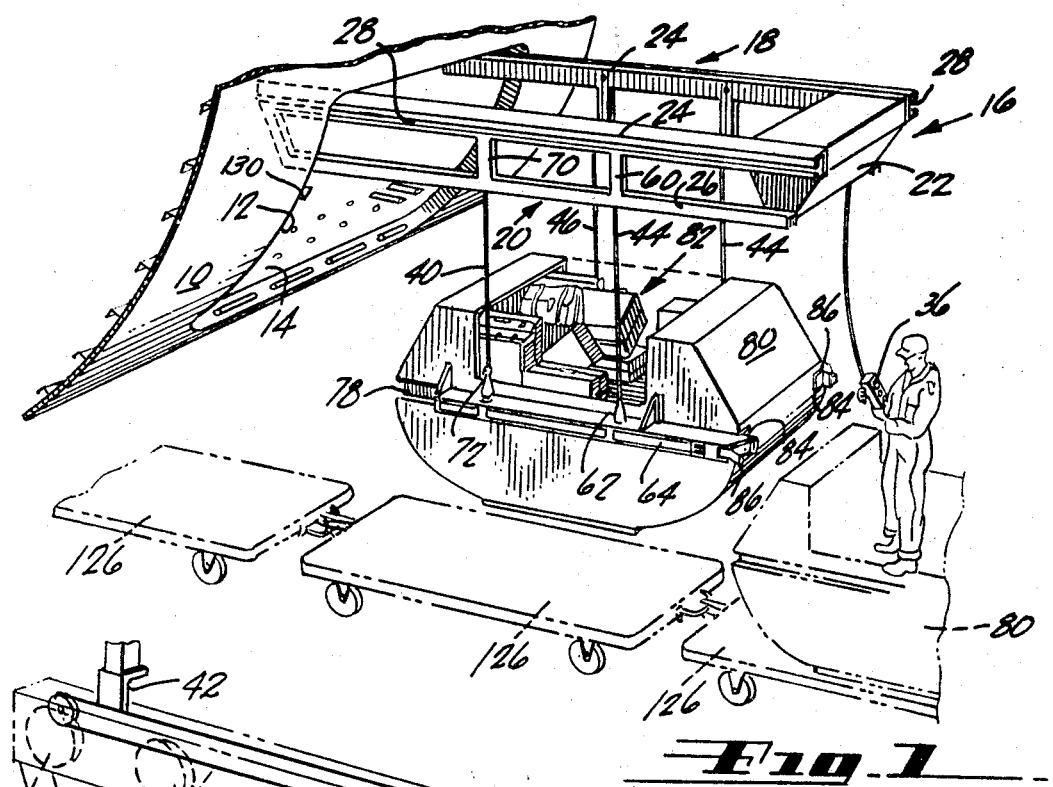
FIG. 1 is a perspective view of the hoisting apparatus of this invention showing its connection with an aircraft fuselage and a cargo baggage container.
Figure 2:
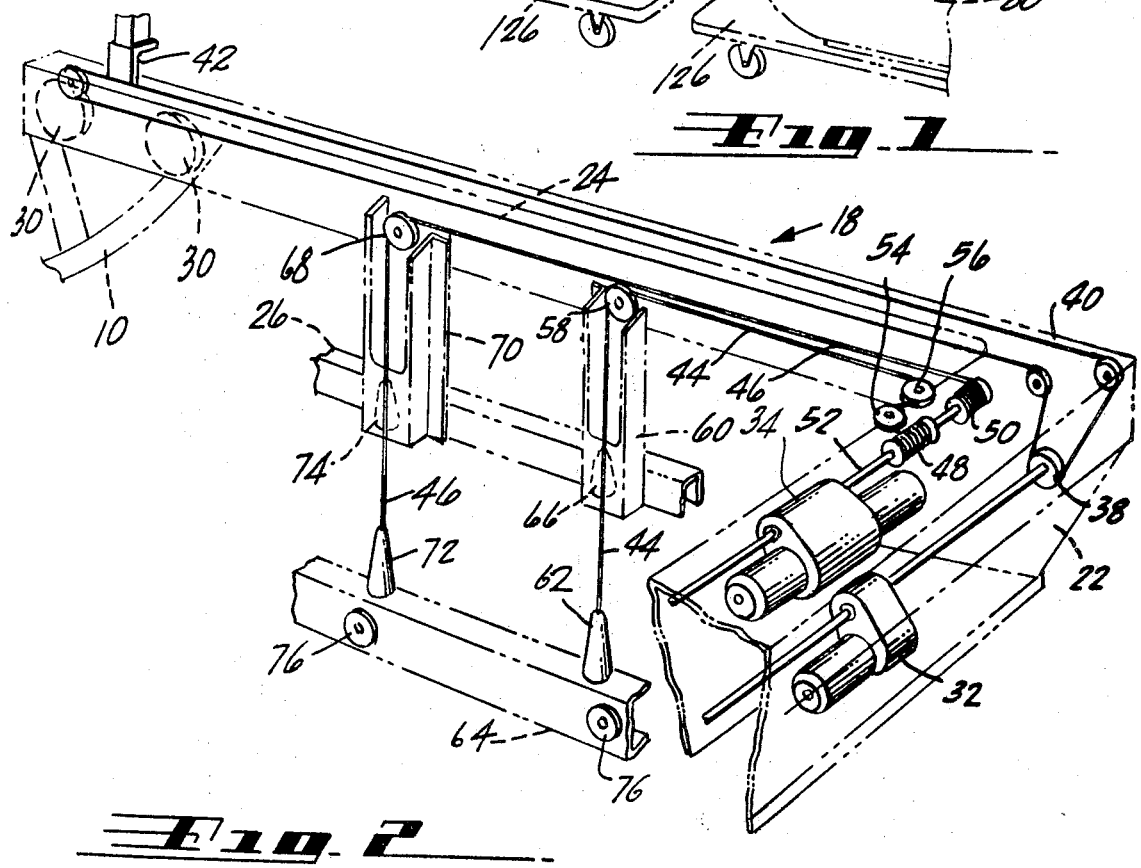
FIG. 2 is a fragmentary sectional view of the hoist assembly of this invention showing the operating mechanism for the hoist.

Referring particularly to the drawing, there is shown an aircraft fuselage or enclosure 10 having a baggage compartment opening 12 therein. Opening 12 is depicted to be on the lower portion of the fuselage of the aircraft and on the side thereof. In modern day aircraft it is common for the baggage compartment to be located beneath the passenger floor of the aircraft. Within the opening 12 is shown a baggage compartment floor 14. A hoisting mechanism 16 is supportingly held within the aircraft fuselage 10 and adjacent the top of the opening 12. Hoisting mechanism 16 is slidably contained within the fuselage 10 and is capable of being wholly contained within the fuselage 10, and when desired, can be slidable from fuselage 10 to the extended position shown in FIG. 1 of the drawing. Hoisting mechanism 16 includes laterally spaced side assemblies 18 and 20. Side assemblies 18 and 20 are connected together at their forward end through housing 22. Each of the side assemblies 18 and 20 include upper supporting rails 24 and lower supporting rails 26. The upper supporting rails 24 contain a roller track 28 therein, which is to cooperate with rollers 30, which are secured to the fuselage 10 and permit sliding movement of the entire hoisting assembly 16.

Contained within the housing 22 are a first motor assembly 32 and a second motor assembly 34. First and second motor assemblies 32 and 34, respectively, are to be operated manually through electrical control mechanism 36. First motor assembly 32 operates a pulley 38 which causes movement of cable 40. Cable 40 is securely attached to the aircraft fuselage 10 through an attachment 42. Through the actuation of first motor assembly 32, the entire hoisting assembly 16 can either be extended or placed in the stored position within the aircraft fuselage, or in any other intermediate position.

Second motor assembly 34 operates a forward cable 44 and a rearward cable 46. It is to be understood that both the first and second motor assemblies 32 and 34, respectively, operate cable systems located within each of the side assemblies 18 and 20 of the hoisting mechanism 16, and since each of the assemblies are identical in construction, the cable assembly which is related to side assembly 18 is only shown in the drawings. Where cable 40 is of a continuous length, cables 44 and 46 are not continuous and one terminal of each is wound upon a spool 48 and 50, respectively. Spools 48 and 50 are axially connected to motor shaft 52. Since both of the spools 48 and 50 are operated by the same motor at the same speed, each of the cables 44 and 46 will be displaced the same distance and at the same velocity.

Cable 44 passes over idler pulleys 54, 56 and 58, and passes through a vertical brace 60 connecting the upper support rail 24 with the lower support rail 26. Cable 44 terminates and is securely connected to locating pins 62 which is connected to a hoist bar 64. Locating pin 62 matingly engages into cone-shaped aperture 66 thereby assuring proper location of the hoist bar 64 when in the fully up position. Cable 46 cooperates in the same manner as cable 44, as with a second idler wheel 68, a second vertical brace 70 and a second locating pin 72. Placement of locating pin 72 is rearward of, or closer to, the aircraft fuselage and spaced a sufficient distance from locating pin 62. Locating pin 72 also matingly cooperates with a cone-shaped aperture 74 in the same manner as locating pin 62 cooperates with aperture 66.

It is to be known that there is a pair of hoist bars 64, one hoist bar being supported by side assembly 18, and the other being supported by side assembly 20. The hoist bars are to inwardly face each other in a mirrorlike image, each hoist bar being identical in design and, as will become apparent, each hoist bar cooperating with the other to accomplish the intended function of this invention.

Attached to the inward or facing sides of each hoist bar 64 is a pair of rollers 76. Rollers 76 are to cooperate within channel-shaped tracks 78 of the load supporting element 80. The load supporting element 80 shown in FIG. 1 of the drawings is a container in which passenger baggage 82 is contained therein. However, it is contemplated that this invention will function with a pallet or the like. A stop 84 is located at the forward end of each of the hoist bars 64 which is to come into abutting relationship with the forward edge of the load supporting element 80. The stops 84 insure proper positioning of each of the hoist bars 64 with respect to the load supporting element 80.

Latching mechanism 86 includes a latching pawl 88 which is pivotally attached to hoisting bar 64 by means of pivot pin 96. Latching pawl 88 includes a latching head 90 which is to matingly cooperate with a detent 92 of the load supporting element 80. Latching pawl 88 is biased by a spring 94 to maintain locking head 90 into engagement with detent 92. Also, pivotally supported through pivot pin 96 are side plates 98 and 100. Each of the side plates 98 and 100 are connected together through a release bar or first release means 102 so that they operate as a single unit. Each of the side plates 98 and 100 are also biased by a spring in the same manner as latching pawl 88 by springs 104 and 106, respectively. Fixedly secured to latching pawl 88 is an upstanding rod 108. Rod 108 cooperates with a slot 110 in the release bar 102.

Pivotally supported through a second pivot pin 112 to the hoist bar 64 is a latching arm or second release means 114. Arm 114 is biased by a spring 116 so that the head portion 118 is maintained flush against hoist bar 64 and back portion 120 of arm 114 extends the maximum distance from hoist bar 64. Latching arm 114 is capable of occupying a first and second position which is so located by depressions 122 and 124, respectively, in which a portion of spring 116 cooperates therewith.

The operation of the latching mechanism 86 is as follows: Latching pawl 88, being under constant bias to the latched position, functions as a ratchet which is in contact with load supporting element 80 until latching head 90 cooperates with detent 92. If it is desired to release latching head 90, release bar 102 is manually moved against the action of springs 104 and 106 until rod 108 contacts the back side of slot 110. Further movement of release bar 102 serves to remove latching head 90 from detent 92 against the action of spring bias 94.

The function of latching arm 114 is such that when arm 114 is in the second position (i.e., spring 116 cooperating with depression 124) the back portion 120 of arm 114 is to contact a protuberance 130 therefor located in the fuselage of the aircraft. The protuberance causes latching arm 114 to pivot against the action of spring bias 116, causing head portion 118 to remove latching head 90 from detent 92. The combination of the arm 114 and the protuberance 130 constitutes second release means for removing latching pawl 88 from engagement with detent 92. Clearly, this unlocks the hoist bar 64 with respect to the load supporting element 80. With the latching arm 114 in the first position (spring 116 cooperating with depression 122), back portion 120 does not contact the protuberance located in the aircraft fuselage therefore not functioning to unlock the hoisting bars 64 with the load supporting element 80.

The operation of the entire hoisting apparatus is as follows: Assuming it is desirable to position a load supporting element 80 from a transporting dolly 126 to within the aircraft fuselage 10, the first procedure would be to manually place hoist bars 64 into locking engagement with the load supporting element. Each of the latching arms 114 of the latching mechanisms 86 are to be located in the second position. Through control mechanism 36 the operator causes actuation of second motor assembly 34 and lifts load supporting element 80 so that its lower surface thereof is on the same plane as the baggage floor 14 of the aircraft fuselage 10. Thereupon, first motor assembly 32 is actuated causing movement of the entire hoisting mechanism 16 through the opening 12 into the fuselage 10. As each of the hoist bars 64 reach the end of their movement within the fuselage 10, back portion 120 of each of the latching arms 114 contacts a respective protuberance which is secured to the fuselage 10. As a result each of the arms 114 is pivoted sufficiently to remove latching head 90 from detent 92 of the load supporting element 80. The procedure is such to not maintain removal of locking head 90 but only to remove it a sufficient time interval so as to permit displacement of the locking head 90 from the detent 92 and permitting withdrawal of each of the hoist bars 64. This movement is permitted due to the ratchet action of locking head 90. In this position the load supporting element 80 is located within the aircraft fuselage and each of the hoist bars 64 are not in engagement therewith. Due to the reverse movement of the hoisting mechanism 16 by first motor assembly 32, each of the hoist bars 64 are removed out of engagement with the load supporting element 80. Further movement of the hoisting mechanism 16 repositions the hoist bars 64 to come in contact with another load support element 80 which is located on a transporting dolly 126.

If it is desired to unload the container from the aircraft, the hoist bar mechanism 16 makes the same movements which were required to place a load supporting element within the aircraft. There is one difference in the position of the structure and that is each of the latching arms 114 of the latching mechanisms 86 are located in the first position, i.e., spring 116 cooperating with depression 122. In this position the back portion 120 of each of the latching arms 114 does not contact the protuberance located on the aircraft fuselage 10. As each of the hoist bars 64 are moved within the fuselage 10, the hoist bars automatically cooperate with a respective channel shaped track 78 on the sides of the load supporting element 80. It has been presumed that load supporting element 80 has been prepositioned adjacent opening 112. Once the hoist bars 64 have come in contact with the load supporting element 80, further movement of such finally results in each locking head 90 to ratchet and be finally located within their respective detents 92 thereby being securely attached to the load supporting element. Reversing the movement of the hoisting mechanism 16 through first motor assembly 32, the load supporting element is removed from the aircraft and is subsequently placed upon a transporting dolly 126. With the load supporting element 80 so placed, the operator manually actuates release bar 102 to effect removal of the hoist bars 64 from contaction with the load supporting element 80. The sequence can then be reactivated to remove another load supporting element.

Although the particular hoisting mechanism of this invention has been described with a specific embodiment of a latching mechanism, it is to be apparent that the aforesaid hoisting mechanism can be combined with other types of latching mechanisms.

I claim:
1. In combination with a vehicle, said vehicle having a body capable of supporting and retaining elements of cargo, said body having an opening therein to permit ingress and egress of said elements of cargo, a cargo handling system comprising:
  a cargo element having two side portions and each of said side portions including therewith pawl engagement means at a predetermined position;
  a hoisting assembly for placing within said body of said vehicle and removing therefrom said elements of cargo, said hoisting assembly being supported by said vehicle and being wholly retainable within said body of said vehicle, means for extending and retracting said hoisting assembly relative to said vehicle, said hoisting assembly including a pair of hoist bars, each of said hoist bars having latch means mounted thereto for disengageably connecting said hoist bars to said cargo element, said latch means including a pawl pivotally mounted on said hoist bar;
  bias means connected to said hoist bar for continuously biasing said pawl into cooperation with said pawl engagement means;
  first release means for releasing said pawl from cooperation with said pawl engagement means; and
  second release means for releasing said pawl from cooperation with said pawl engagement means, said second release means including other means secured to said vehicle and an arm pivotally mounted on said hoist bar, said arm having a portion which is actuatable by the said other means, said pawl being removed from cooperation with said pawl engagement means when said arm is actuated by the said other means, said arm being capable of location in a first and second position and including means to maintain said first and second positions, said arm being located free from actuation by the said other means when in the first position and being in a location actuatable by the said other means when in the second position.

2. The system defined in claim 1 wherein said pawl engagement means include detents formed in the side portions of said cargo element.

3. The system defined in claim 1 wherein each of said hoist bars include a plurality of rollers secured thereto; and said cargo element includes a roller engaging track along each side portion thereof, said rollers being engageable by said tracks to facilitate attachment of said hoist bars to said cargo element.

4. The system defined in claim 1 wherein said means for extending and retracting said hoisting assembly relative to said vehicle include:
  cable and pulley means connected between said hoisting assembly and the body of said vehicle;
  motor means connected to said cable and pulley means; and
  motor control means to allow control of said motor means to extend and retract said hoisting assembly as desired.